United States Patent

Kopetzky et al.

[11] Patent Number: 5,803,400
[45] Date of Patent: Sep. 8, 1998

[54] METHOD AND APPARATUS FOR SECURING THE END OF A THREAD STANDING UNDER TENSION TO A THREAD REEL

[75] Inventors: Robert Kopetzky, Lonsee; Frank Mueller, Blaustein; Ulrich Diepold, Ulm; Sabine Dreizler, Stuttgart; Frank Pietschmann, Sontheim; Matthias Pleyer, Ulm, all of Germany

[73] Assignee: Takata (Europe) Vehicle Safety Technology GmbH, Germany

[21] Appl. No.: 679,763

[22] Filed: Jul. 10, 1996

[30] Foreign Application Priority Data

Jul. 10, 1995 [DE] Germany .......................... 195 25 076.1

[51] Int. Cl.⁶ .................................................. B65H 75/28
[52] U.S. Cl. ..................................... 242/586.1; 242/125.1; 242/172; 242/579
[58] Field of Search ................................ 242/532, 586.1, 242/125, 125.1, 172, 532.5, 586, 579

[56] References Cited

U.S. PATENT DOCUMENTS 4,525,002  6/1985  Herubel ........................................ 289/2
5,409,176  4/1995  Kopetzky .............................. 242/375.3

FOREIGN PATENT DOCUMENTS

| 0 581 228 A1 | 2/1994 | European Pat. Off. . |
| 995 376 | 5/1951 | France . |
| 163855 | 9/1933 | Switzerland ........................ 242/125.1 |
| 26357 | 10/1912 | United Kingdom . |

OTHER PUBLICATIONS

"Cours de Navigation Des Glenans", nouvelle edition de Seuil, 1982, pp. 174–175.

*Primary Examiner*—John Q. Nguyen
*Attorney, Agent, or Firm*—Foley & Lardner

[57] ABSTRACT

A thread reel, with a thread wound thereon, has a holding pin at its periphery upon which the end of the thread is secured such that a plurality of loops are laid around the holding pin in such a way that in each case the end of each loop, respectively, facing the thread reel simultaneously forms the start of the next loop which is further spaced from the thread reel, with the end of the next loop remote from the preceding loop lying closer to the thread reel than the end to which it is connected.

16 Claims, 11 Drawing Sheets

METHOD AND APPARATUS FOR SECURING THE END OF A THREAD STANDING UNDER TENSION TO A THREAD REEL

BACKGROUND OF THE INVENTION

1. Field of the Invention

The invention relates to a method and to an apparatus for securing the end of a thread standing under tension to a thread reel which is wound with the thread and which is preferably the first or second thread reel of a spring-driven reeling device for safety belts in motor vehicles. Furthermore, the subject of the invention includes a thread reel.

2. Description of the Related Art

Such reeling devices for safety belts in motor vehicles have a belt reel which can be blocked against rotation in the pull out direction by a draw-out blocking device in the event of accident-dependent accelerations and/or with an attempted rapid pull out of the safety belt and which is rotationally fixedly connected, in particular coaxially and directly connected, to a first thread reel which tapers in an axial direction and has a spiral guide groove on its periphery. The first thread reel is rotationally fixedly connected via the thread, which is wound into the guide groove opposite to the winding sense of the safety belt on the belt reel and is secured at one end to the thread reel, to a further, second thread reel which is arranged parallel to and in lateral alignment with the first thread reel. The other end of the thread is secured to the further thread reel and is wound into its guide groove. The further thread reel is pretensioned by a spring arrangement, preferably by a spiral spring arrangement, in the winding up direction of the thread onto the second thread reel and of the safety belt onto the belt reel. The two guide grooves are so designed and arranged on the thread reels that the tensioned thread piece connecting the two thread reels merges in an essentially kink-free manner into both thread turns located on the thread reels. In such belt reeling devices the thread which is wound onto the two thread reels stands under a certain tensile stress throughout the whole lifetime of the vehicle and this tensile stress is also continuously subjected to changes during the use of the safety belt. As a result of the permanent loading, and also of the alternating forces, it is decisively important for such reels that the thread is secured to the thread reels so that no danger of breakage exists, in particular at these points of attachment.

A spring-driven reeling device for safety belts of the above described kind is, for example, disclosed in EP 0 581 228 A1.

SUMMARY OF THE INVENTION

One of the objects of the present invention is to provide a method and an apparatus for securing the end of a thread standing under tension to a thread reel which is wound with the thread. Another object of the present invention is to provide a thread reel in which a problem-free attachment of the thread end to the thread reels is ensured, holding reliably over long operating periods despite loads acting on the thread, even pronounced load changes at the critical point of attachment which could lead to a thread break. Furthermore, an economical installation should be possible even with mass production.

In order to satisfy these objects method-wise, the invention provides for:

arranging a holding pin on the thread reel, preferably radially outward, with the free end of the holding pin being accessible;

winding a first loop of the thread, which is preferably held at least under light tension, around an installation pin having a free end;

arranging the installation pin with its free end face at a small distance from or in contact with the free end face of the holding pin and preferably in axial alignment with the latter;

shifting the first loop from the installation pin onto the holding pin;

removing the installation pin from the holding pin;

winding a second loop of the thread around the installation pin in such a way that the thread portion adjoining the end of the first loop facing the thread reel is laid around the installation pin analogously to the first loop, whereupon the installation pin is again arranged with its free end face at a small distance from or in contact with the free end face of the holding pin and preferably in axial alignment with the latter, and the second loop is shifted from the installation pin onto the holding pin.

Apparatus-wise the present invention includes a holding pin with a free end which is connected to a thread reel, and also an installation pin with a free end, the installation pin being designed to execute a loop formation movement and having a stripper which, upon arrangement of the free end of the installation pin carrying a loop opposite to the free end of the holding pin, can strip the loop from the installation pin and transfer it onto the holding pin.

The invention also includes a thread reel which includes, preferably at its outer periphery, a holding pin with an accessible end on which the end of the thread is secured by a plurality of loops laid around the holding pin in such a way that, in each case, the end of each loop facing the thread reel simultaneously forms the start of the next loop spaced somewhat further from the thread reel, with the end of the next loop remote from the preceding loop lying closer to the thread reel than the end connected to it.

The concept underlying the invention is that at least two, preferably three to four self-locking thread loops, are provided on a holding pin connected to the thread reel and preferably having a head, whereby measures such as heating, adhesive bonding or the like are not required to produce the connection between the thread end and the holding pin. Thus, this avoids measures which could lead to the thread characteristics being impaired. As a result of the loop formation in accordance with the invention, the run-in of the thread ends onto the holding pin, which is rounded and preferably circularly rounded and which has a diameter which is not too small, takes place on continuously curved surfaces so that a kinked loading of the thread is avoided. By a suitable choice of the diameter of the holding pin, which is also smooth in the axial direction, it is also possible to restrict the curvature of the thread at the holding pin to values which do not have the consequence of a reduction in strength of the wound-around thread. The diameter ratio of the holding pin and the thread should preferably be at least 10:1 or more.

The measures in accordance with the invention serve to form the self-locking loops on the holding pin, and can be executed automatically by machine. Because of the required self-locking, and also the required drawing together of each individual loop, the loops which are formed through a suitable movement of the installation pin from the thread which stands under a light tension are shifted individually one after the other onto the holding pin. Because of the light tension, each loop pushed onto the holding pin is tensioned individually in such a way that it reliably sits on the holding pin without further yielding. Thereafter the next loop can be formed and pushed onto the first loop, which already sits tightly on the holding pin, and can be drawn tight.

Two loops are sufficient for a self-locking attachment of the thread end to the thread reel. In accordance with the invention, however, three to four loops placed on top of one another are preferred.

BRIEF DESCRIPTION OF THE DRAWINGS

The accompanying drawings, which are incorporated in and constitute a part of the specification, illustrate preferred embodiments of the invention, and, together with the general description given above and the detailed description given below, serve to explain the principles of the invention.

DETAILED DESCRIPTION OF THE PREFERRED EMBODIMENTS

Figure 1:
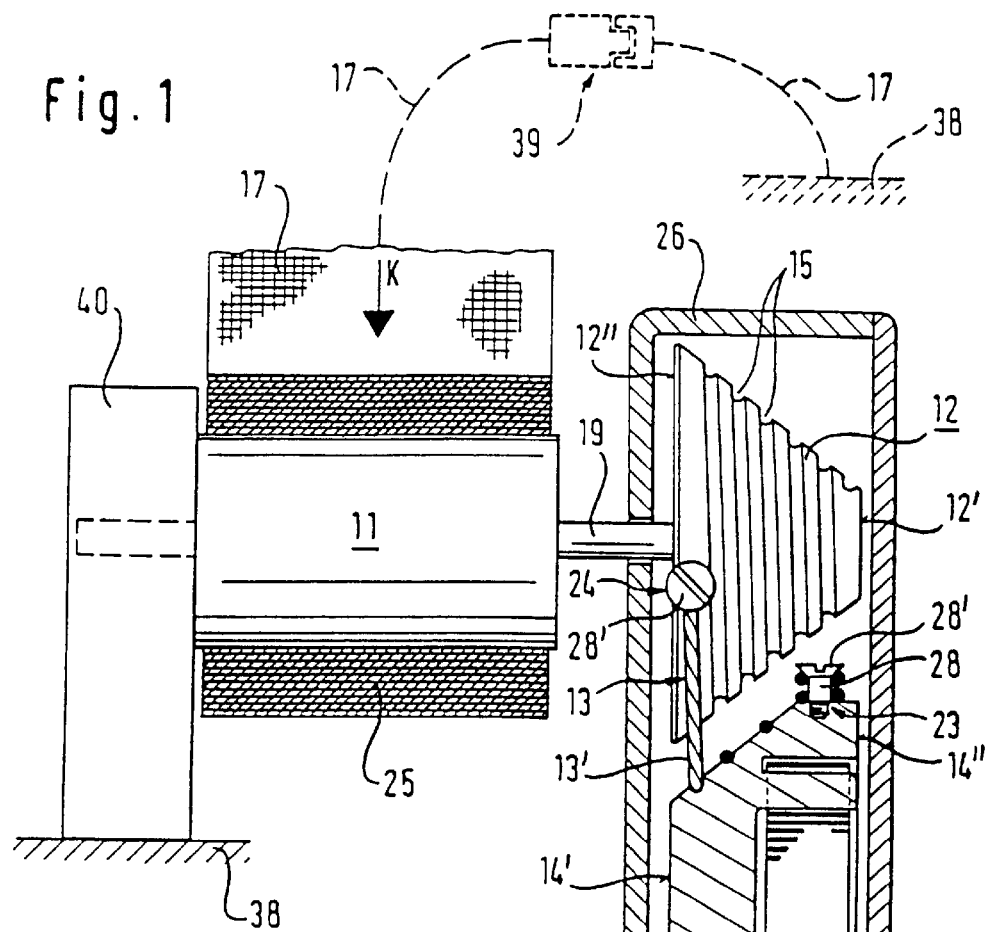
FIG. 1 is a partially sectioned, schematic reproduction of a spring-driven belt reel for safety belts in motor vehicles, wherein the thread used for the transmission of the retraction force is secured in the manner of the invention to the thread reels.

Referring to FIG. 1, a belt reeling device in accordance with the invention has a belt reel 11 onto which a safety belt 17 can be wound. Only a short piece of this belt is indicated in FIG. 1. The belt is guided in the manner indicated in broken lines via a customary belt lock 39 around the body of a non-illustrated vehicle occupant to the vehicle chassis 38 and is secured thereon. The invention is not only usable with two-point belts but also with three-point belts. The belt reel 11 is rotatably journalled at a housing 26 by means of a rotary shaft 19 and the housing is, in turn, secured at the bottom to the vehicle chassis 38. A conically shaped thread reel 12 having smaller and larger end faces 12' and 12", respectively, is arranged within the housing 26 at the end of the rotary shaft 19 remote from the belt reel 11 and is provided on its periphery with a spiral-shaped guide groove 15. At the end face of the belt reel 11 remote from the thread reel 12, there is indicated, in a purely schematic manner, a belt drive blocking device 40. This blocking device 40 is secured to the vehicle chassis 38 and prevents the further drawing out of the belt 17 in the event of accident dependent accelerations and/or of sudden drawing out of the safety belt 17.

Figure 4:
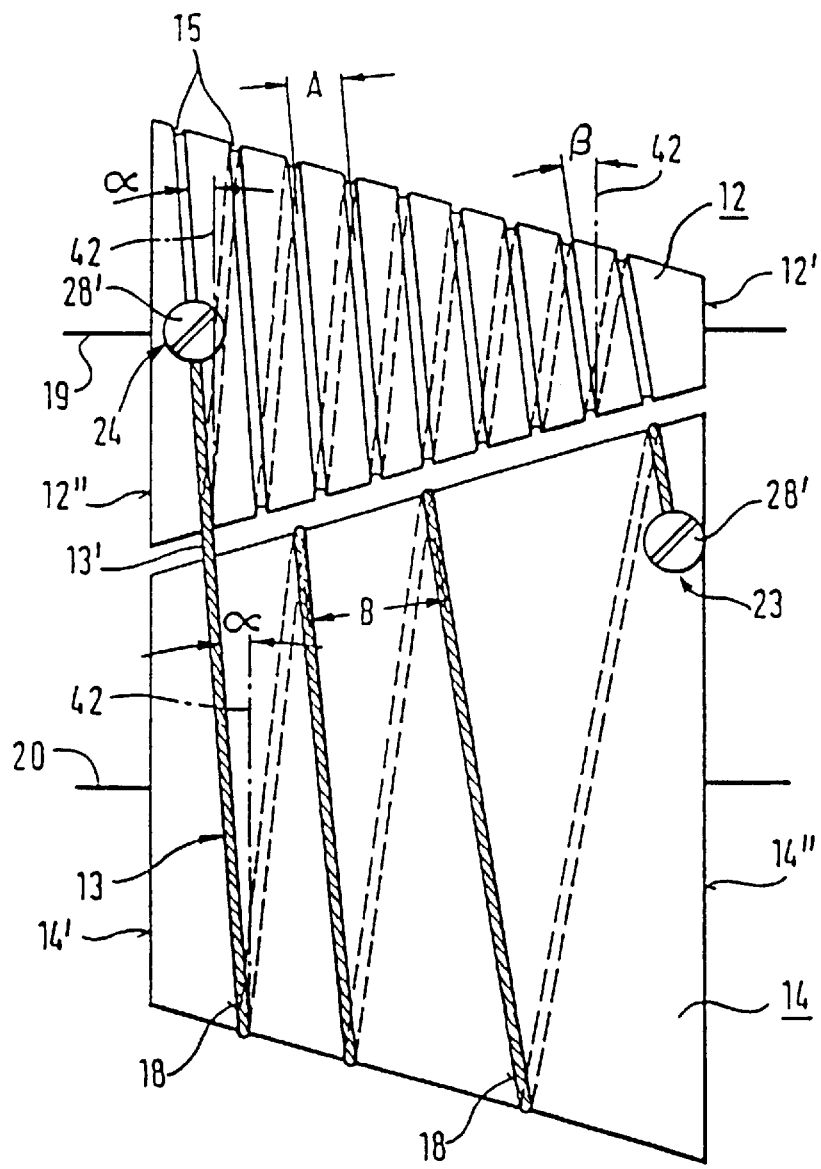
FIG. 4 is a side view of a further embodiment of the thread reels in a reeling device in accordance with FIG. 1.

In accordance with FIGS. 1 and 4, a further thread reel 14 is provided alongside the thread reel 12 laterally aligned therewith and with its axle or shaft 20 parallel thereto. The further thread reel 14 has a small end face and a large end face 14' and 14", respectively. The further thread reel 14 extends conically in the opposite direction to the first thread reel 12 and its smaller diameter is the same as the larger diameter of the first thread reel 12. The left hand large end face 12" in FIG. 1 and the right hand small end face 12' of the small thread reel 12 each lie essentially in a plane with the left hand small end face 14' and the right hand large end face 14" of the large thread reel 14, respectively. The second thread reel 14 also has a spiral guide groove 18 at its periphery and the precise geometrical path of the guide groove can be seen from FIG. 4.

The second thread reel 14 sits rotatably on shaft 20 fixed to the housing, with the shaft 20 being secured to the housing 26 parallel to and at a lateral spacing from the shaft 19.

The second thread reel 14 has, in accordance with FIG. 1, at the side of its large end face, a coaxial hollow cavity 21 in which a spiral spring arrangement 16 is provided. The spiral spring is secured at one end to a fixed spigot 22 of the housing, which carries the shaft 20, and at the other end to the peripheral wall of the hollow cavity 21 of the thread reel 14. The spiral spring 16 transmits a torque to the thread reel 14, which attempts to wind up a thread 13 laid into its guide groove 18 and secured in accordance with FIG. 4 at mounting point 23. The thread 13 extends in accordance with FIGS. 1 and 4 from the narrowest part of the thread reel 14 to the part of the guide groove 15 of the first thread reel 12 aligned with it, where the thread 13 is secured to the first thread reel 12 at mounting point 24.

In the winding position which can be seen from FIGS. 1 and 4, the thread 13 is largely fully wound onto the thread reel 14 and is largely fully unwound from the first thread reel 12. In this state the belt coil 25 on the belt reel 11 has the largest diameter, i.e., a maximum belt length is now wound onto the belt reel 11 and the belt 17 is drawn in to the greatest degree.

If the belt 17 is now drawn out opposite to the retraction force K in FIG. 1, then the first thread reel 12 rotates in such a sense that the thread 13 is successively wound onto the first thread reel 12 and unwound from the second thread reel 14, with the thread 13 being increasingly laid into the guide groove 15 and removed from the guide groove 18.

The axial spacing B of turns of the guide grooves 18 on the thread reel 14 having a larger diameter increases, with a uniform axial spacing A of the guide groove 18 on the first thread reel 12, continuously in the axial direction to the larger diameter in the manner which can be seen from FIG. 4. This arises since the pitch angle $\alpha$, i.e., the angle between the straight line extension of the guide grooves 15, 18 at the run-in points of the straight thread piece 13' and the plane 42 standing perpendicular to the axis of rotation 19, 20, is the same and since care has been taken by appropriate attachment of the thread ends to the mounting points 23, 24 so that the free and straight thread piece 13' extending between the thread reels 12, 14 opens in kink-free manner into the guide grooves 15, 18.

The fact that the turns of the spiral guide groove 15 on the first thread reel 12 are displaced by the same axial amount A signifies that the pitch angle increases from α to β from the larger diameter to the smaller diameter.

It would also be conceivable to execute the guide groove 15 on the periphery of the thread reel 12 in such a way that the pitch angle α is constant, which would, however, signify that the axial spacing A of adjacent turns of the guide grooves 15 reduces as the diameter becomes smaller. Accordingly, the axial spacing B of adjacent turns of the guide groove 18 on the thread reel 14 would have to be reduced in order to allow the pitch angle to be constant there.

Figure 2:
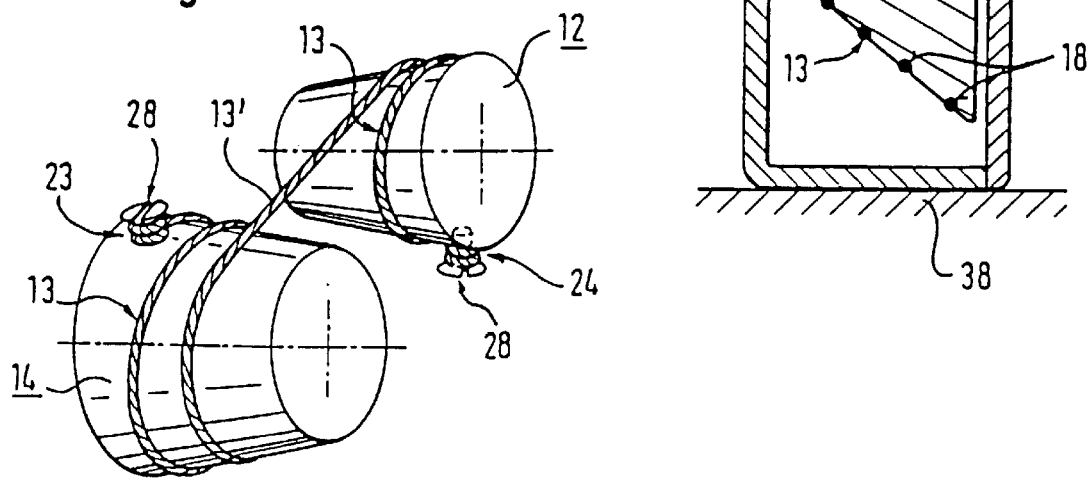
FIG. 2 is a perspective view of the thread reels of FIG. 1, with the thread wound thereon, and of the attachment of the invention.

In FIG. 2, the arrangement of the two oppositely conical thread reels 12, 14 and of the thread 13 wound thereon is schematically illustrated in a perspective view, without the guide grooves 15, 18 being shown.

Figure 3:
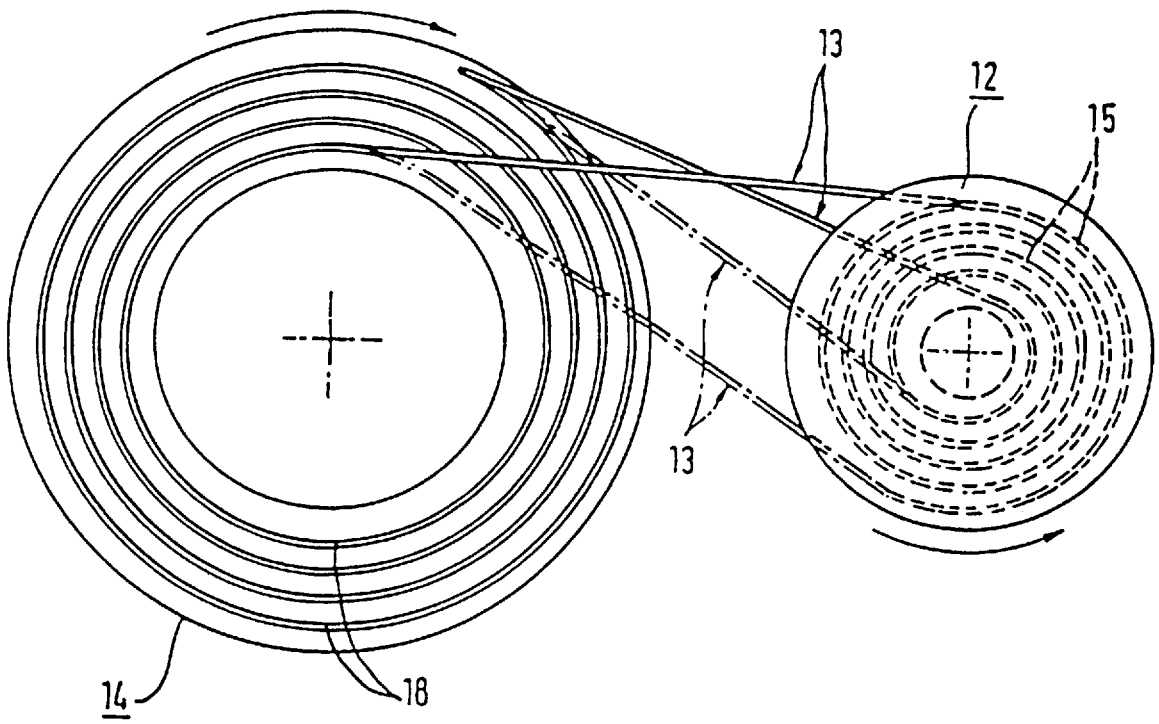
FIG. 3 is an end view of the subject of FIG. 2, with two possibilities for guiding the thread from one thread reel to the other.

FIG. 3 shows in two embodiments the two end positions of the thread 13 in the fully wound up and fully unwound state on the two thread reels 12 and 14 respectively.

Referring to FIG. 3, the thread 13 shown in solid lines is guided tangentially cross-wise to the neighboring thread reels 12, 14. The fully wound or the fully unwound state of the thread 13 for a non-crossed guidance from one thread reel 12 to the neighboring thread reel 14 in the same direction is shown in chaindotted lines.

The smaller diameter of the thread reel 12 can, for example, be 15 mm or somewhat larger, while the larger diameter of the smaller thread reel 12 should be about 30 to 35 mm. Accordingly, the smaller diameter of the thread reel 14 is 30 to 35 mm and the larger diameter of the thread reel 14 is 100 to 120 mm.

Referring to FIGS. 1, 2 and 4, the ends of the thread 13 are respectively secured to the respectively largest circumference of the thread reels 12 and 14 by means of radial holding pins 28, which are provided with a conically divergent screw head 28' extending away from the pin part.

The holding pins 28, which are, for example, formed as screws, can also be arranged axially at the end face 12" or 14" or in a recess provided there, with the thread 13 being guided to this position through a suitable opening at the periphery of the thread reel 12 or 14 respectively.

Referring to FIGS. 5 to 10, the following will describe how the thread ends can be reliably secured in kink-free manner at the holding pins 28.

Figure 5:
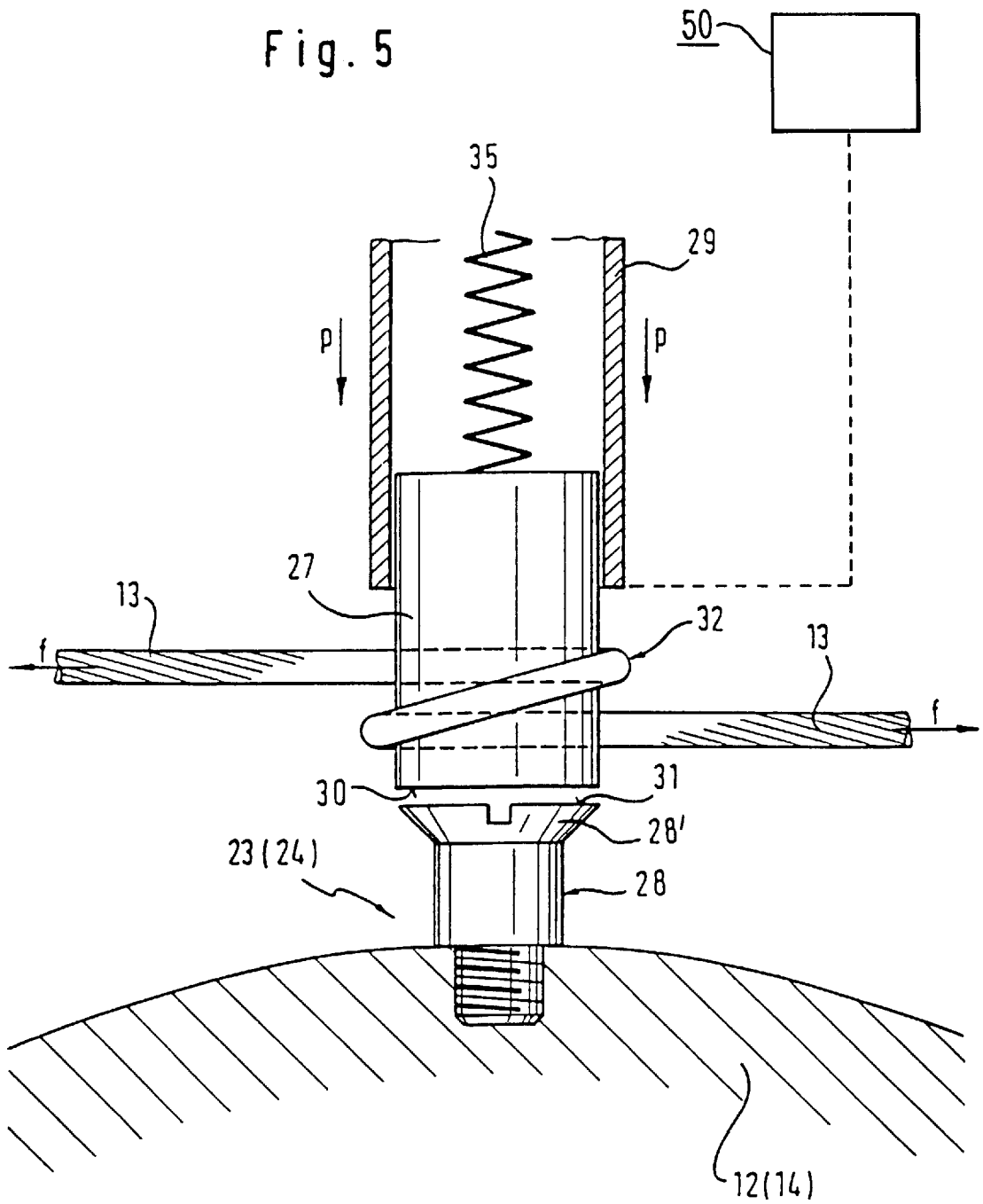
FIG. 5 is an enlarged partial peripheral view, in the axial direction of one of the thread reels in accordance with the preceding embodiments in the region of the point of attachment for the thread, with an installation pin and a stripper for the fastening device of the invention also being shown during the formation of a first loop.
Figure 11:
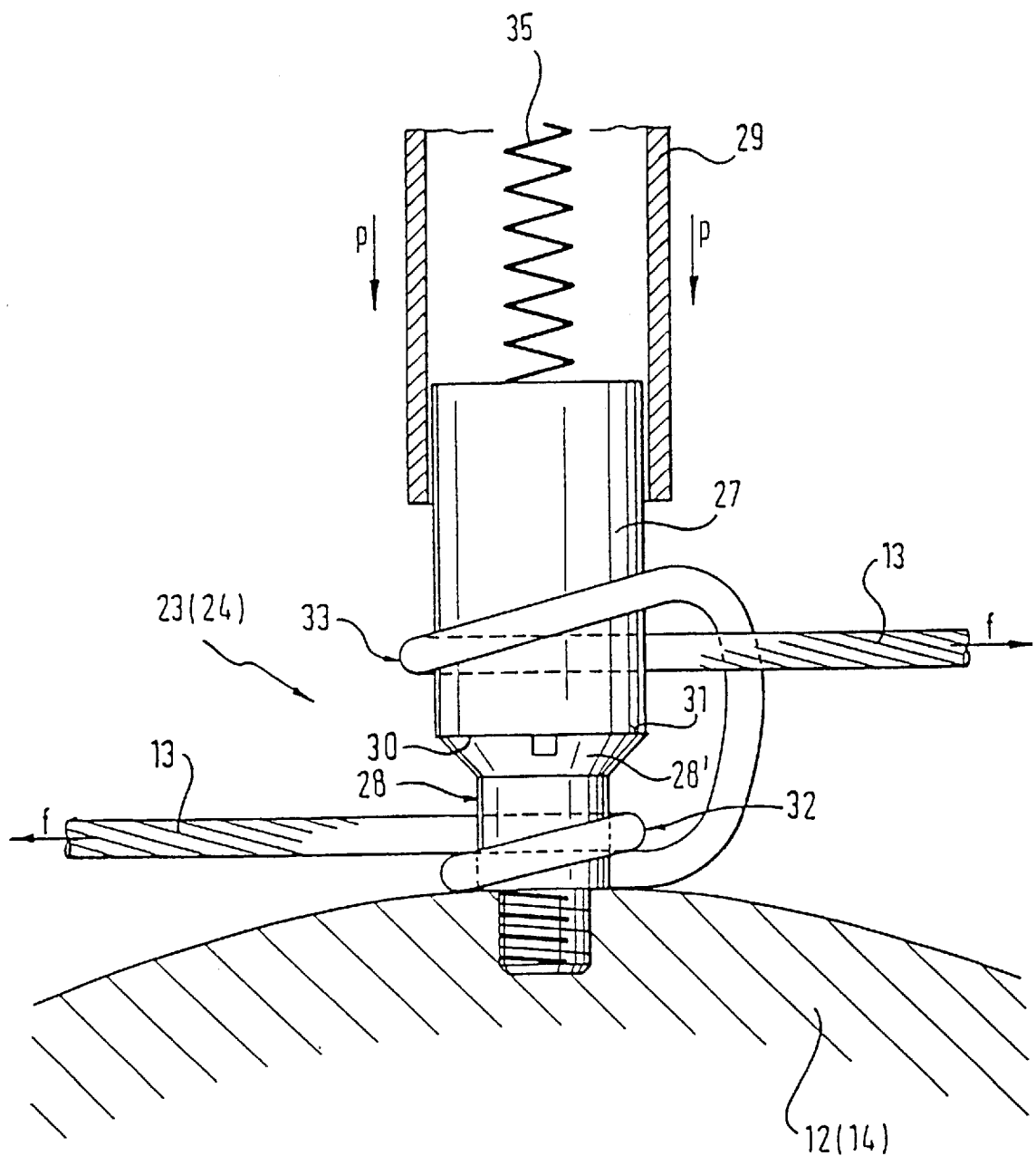
FIG. 11 shows the installation pin in contact with the holding pin.

Referring to FIG. 5, a right or circularly cylindrical installation pin 27 is arranged above the holding pin 28 of one of the thread reels 12 or 14 in such a way that its free end face 30 is arranged directly opposite to and confronts the likewise circular end face 31 of the head 28' of the holding pin 28. The free end face 30 can contact the end face 31, as seen in FIG. 11. The free end face 30 can also be narrowly spaced from the end face 31. In accordance with the invention the dimensioning of the end faces 30, 31 are such that they are congruent to one another. At most the end face 30 of the installation pin 27 may be permitted to project slightly beyond that end face 31 of the head 28'.

A hollow cylindrical stripper or scraper 29 is mounted on the outside of the right cylindrical installation pin 28 and can be displaced downward from the basic position illustrated in FIG. 5 in the direction of the arrows onto the installation pin 27 in FIG. 5. A schematically indicated spring 35 biases the stripper 29 in the direction away from the holding pin 28 so that, in the basic position, the stripper 29 automatically adopts the position of FIG. 5 and is held in this position by a non-illustrated abutment.

The installation pin 27 of the apparatus of the invention is moved by a suitable movement mechanism so that it forms a loop 32 guided around it once from a lightly tensioned thread 13 as shown in FIG. 5.

During this forming of the loop, the end face 30 adopts a position which is sufficiently far removed from the end face 31 so that the thread 13 can be moved beneath the end face 30 during the loop formation. After the loop formation has taken place, the installation pin 27 is placed with its end face 30 axially on the end face 31 of the head 28' of the holding pin 28, or is at least brought, in accordance with FIG. 5, close to the end face 31, whereupon the stripper 29 is pushed downward relative to the holding pin 28 in the direction of the arrow p and the loop 32 is pushed off from the installation pin 27 and onto the holding pin 28. Since the light tension in the thread 13 is maintained, which is indicated by the arrow f, the loop 32 on the holding pin 28 is pulled together in the manner which can be seen from FIG. 6 so that it sits firmly and non-displaceably at the root of the holding pin 28.

The installation pin 27 which has now been freed from the loop 32, is moved away from the end face 31, with the stripper 29 sliding back again into the initial position of FIG. 5 through the action of the spring 35.

Figure 6:
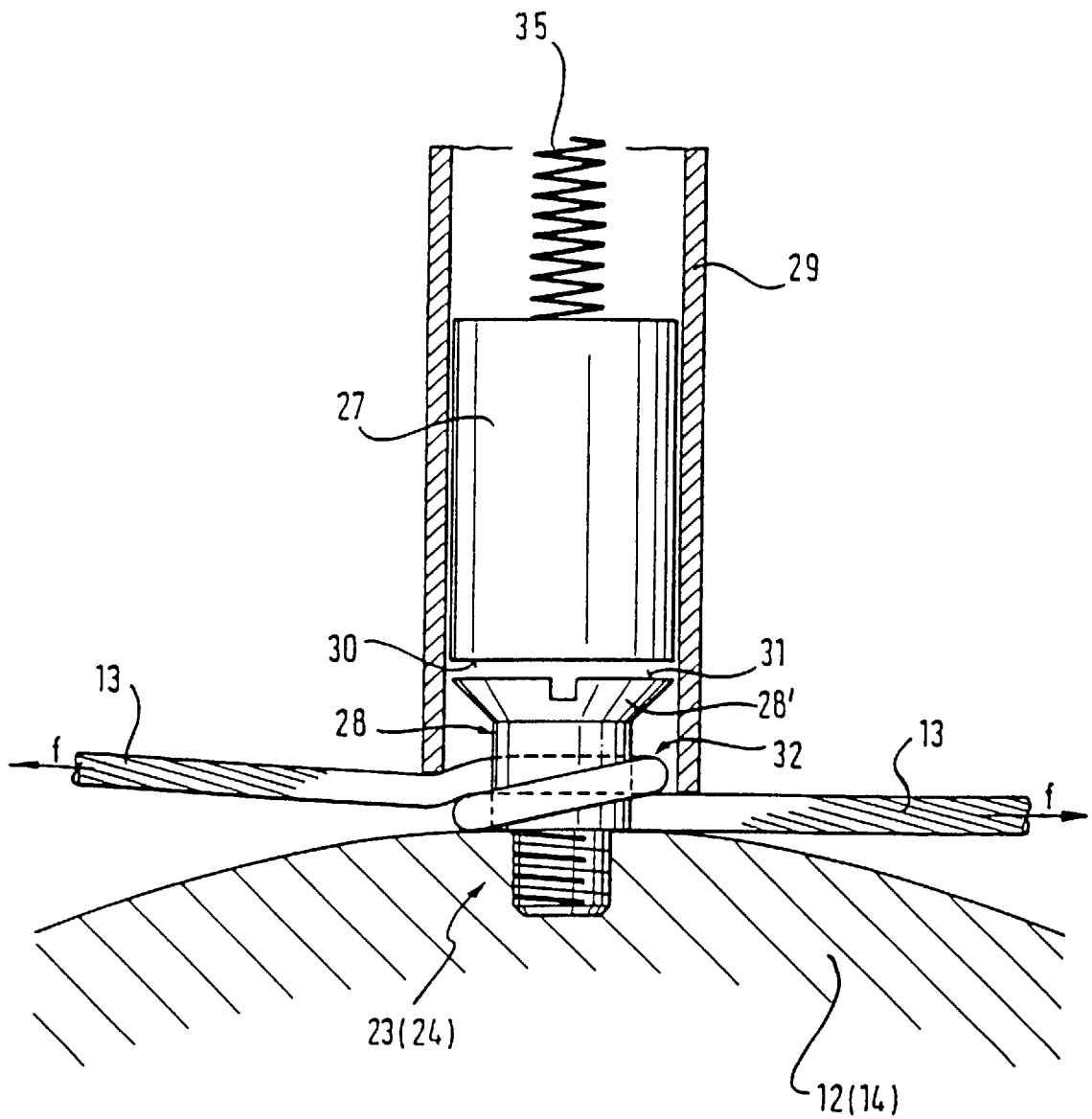
FIG. 6 is a view analogous to FIG. 5 with the first loop having been transferred by the stripper onto the holding pin.
Figure 7:
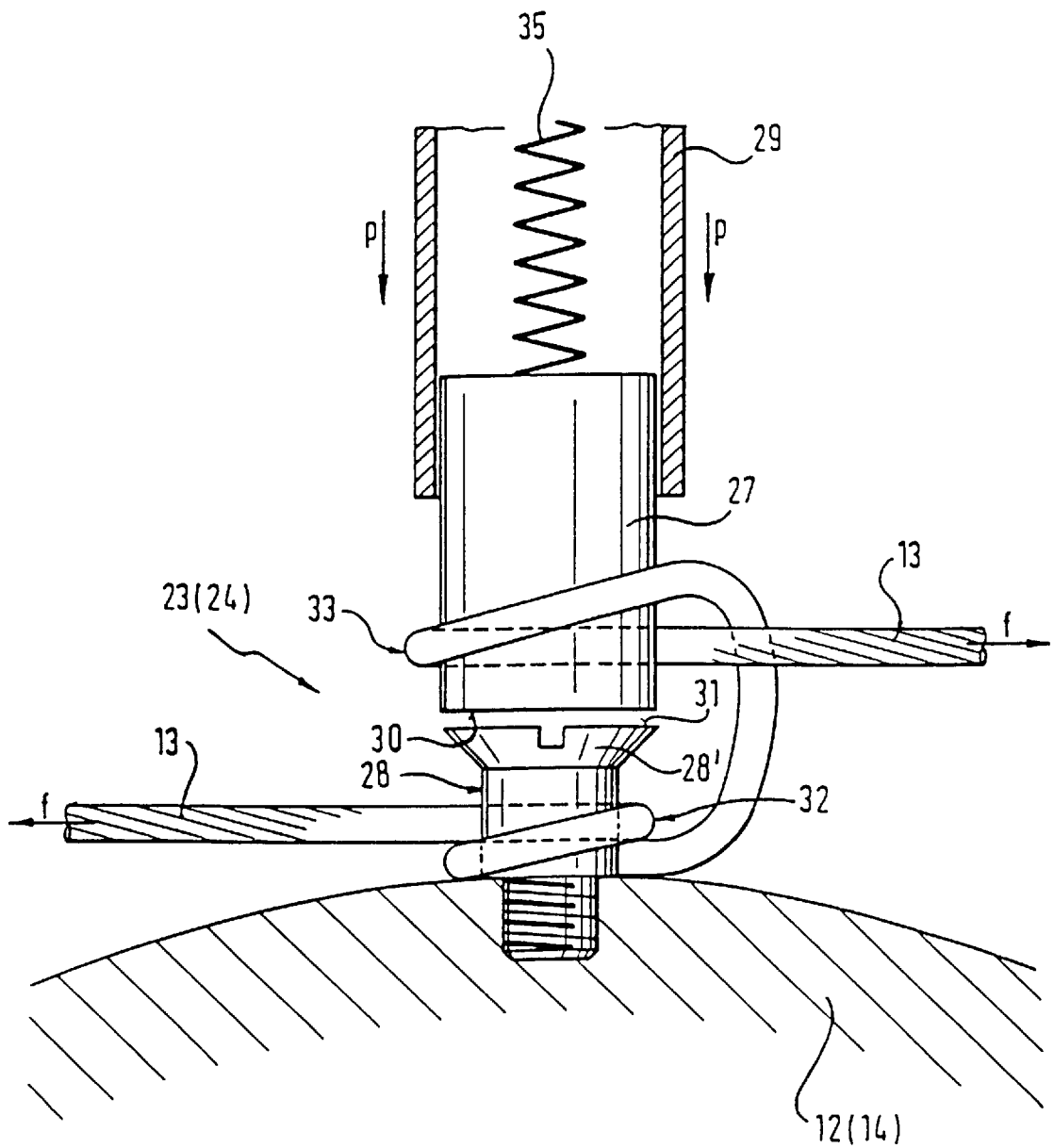
FIG. 7 shows the process of the formation of a second loop in accordance with the invention.

Thereafter the holding pin 28 is again brought up to the right end of the thread 13 in FIG. 6 in order to form a second loop 33 in accordance with FIG. 7. It is important that the lower end of the loop 32 is grasped and that the loop 33 is then placed in an analogous manner to the loop 32 of FIG. 5 around the installation pin 27.

Figure 8:
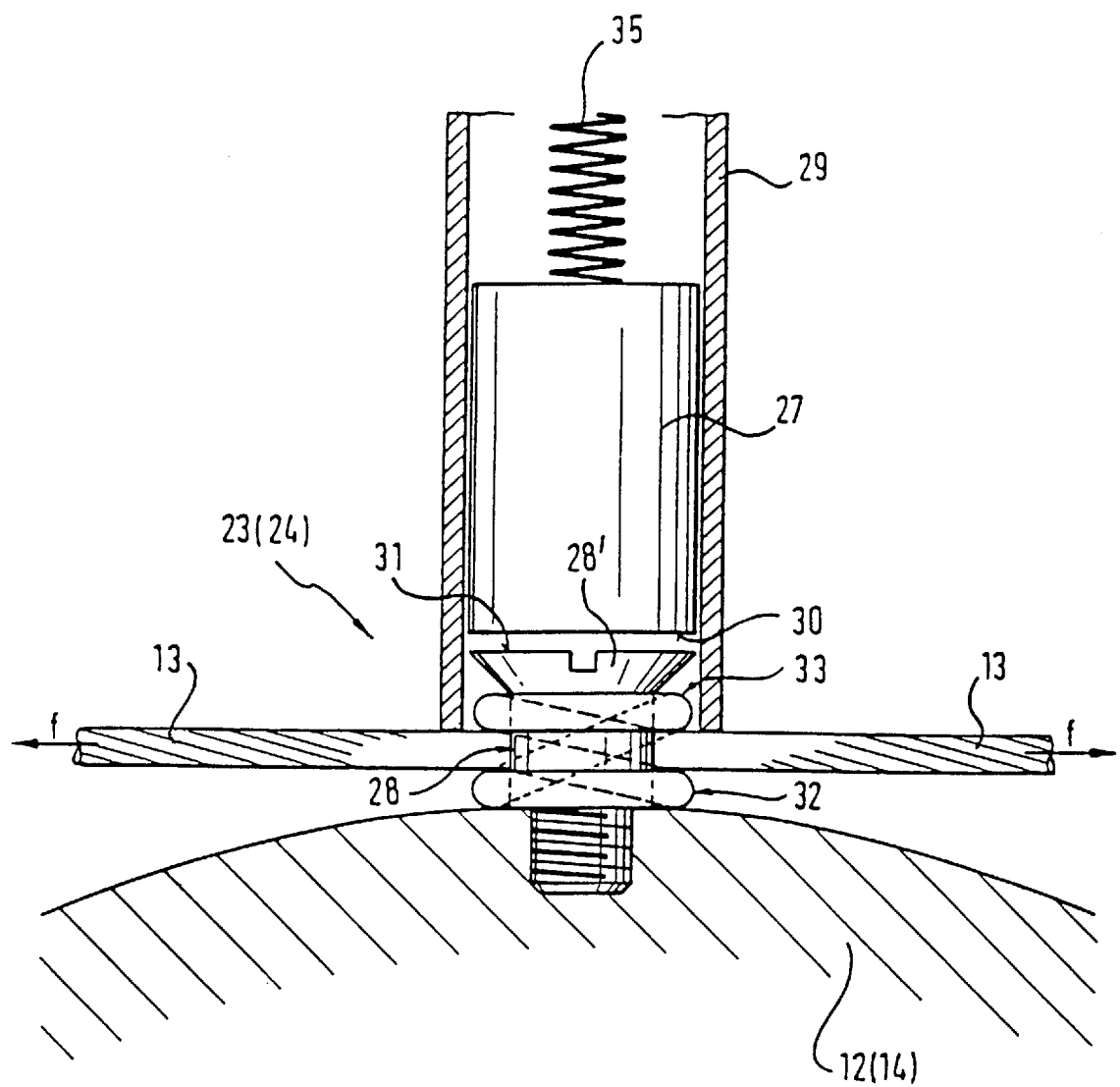
FIG. 8 shows the transfer of the second loop onto the holding pin.

In the next step, the loop 33 is then likewise stripped off in accordance with FIG. 8 onto the holding pin 28 where it pulls itself tight and a self-locking loop-formation is now already present which makes it possible to reliably hold the thread wound onto the thread reel 12, 14 in the one or other direction.

Figure 9:
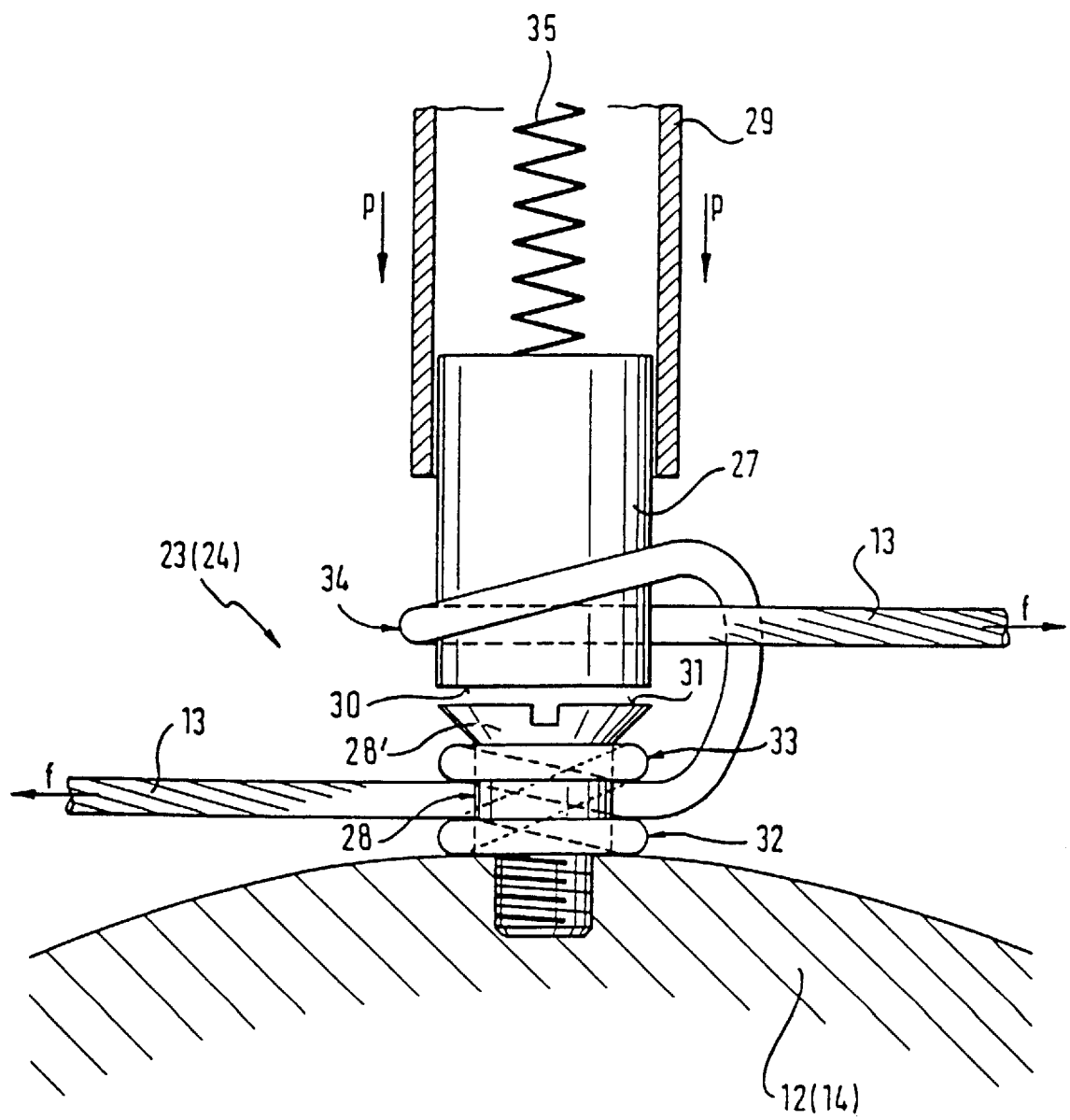
FIG. 9 shows the process of the formation of a third loop on the installation pin.

For the sake of safety a further loop 34 is, however, also applied in accordance with FIG. 9 in similar manner onto the installation pin 27, as has been explained with reference to FIGS. 5 and 7. With this loop it is also important that in each case the lower end of an already formed loop forms the upper end of the new loop. In turn, the end of the loop which opens into the thread lies closer to the thread reel 12, 14 than the starting end of the loop 34.

Figure 10:
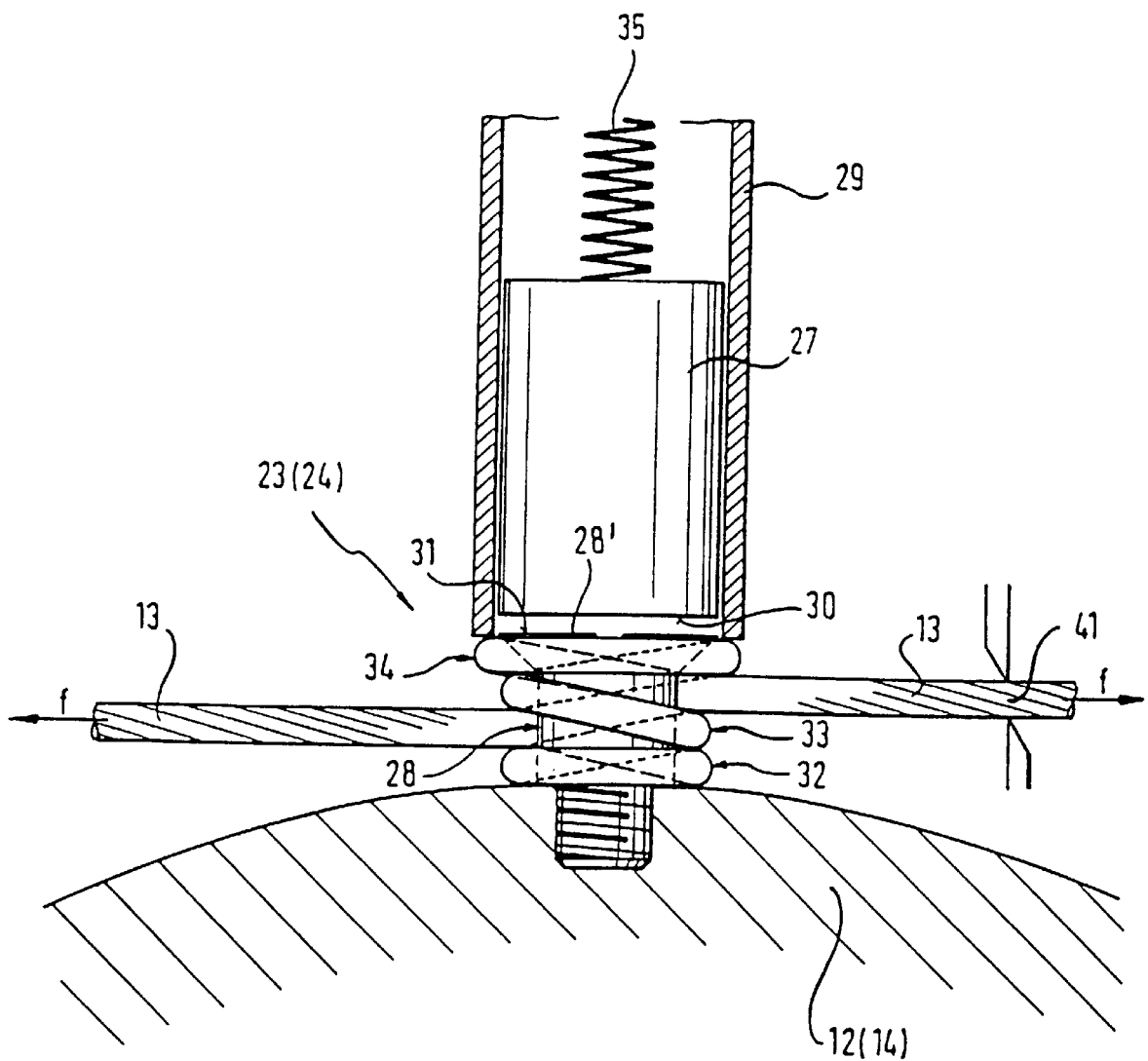
FIG. 10 shows the transfer of the third loop also onto the holding pin of the thread reel.

Finally, the loop 34 is stripped by the stripper 29 onto the holding pin 28, as can be seen from FIG. 10. The last loop 34 now also automatically pulls tight, as a result of the tension present in the thread 13 so that a retention of the thread end 13 on the holding pin 28 is ensured, and this retention is reliable over a long period of time.

Figure 12:
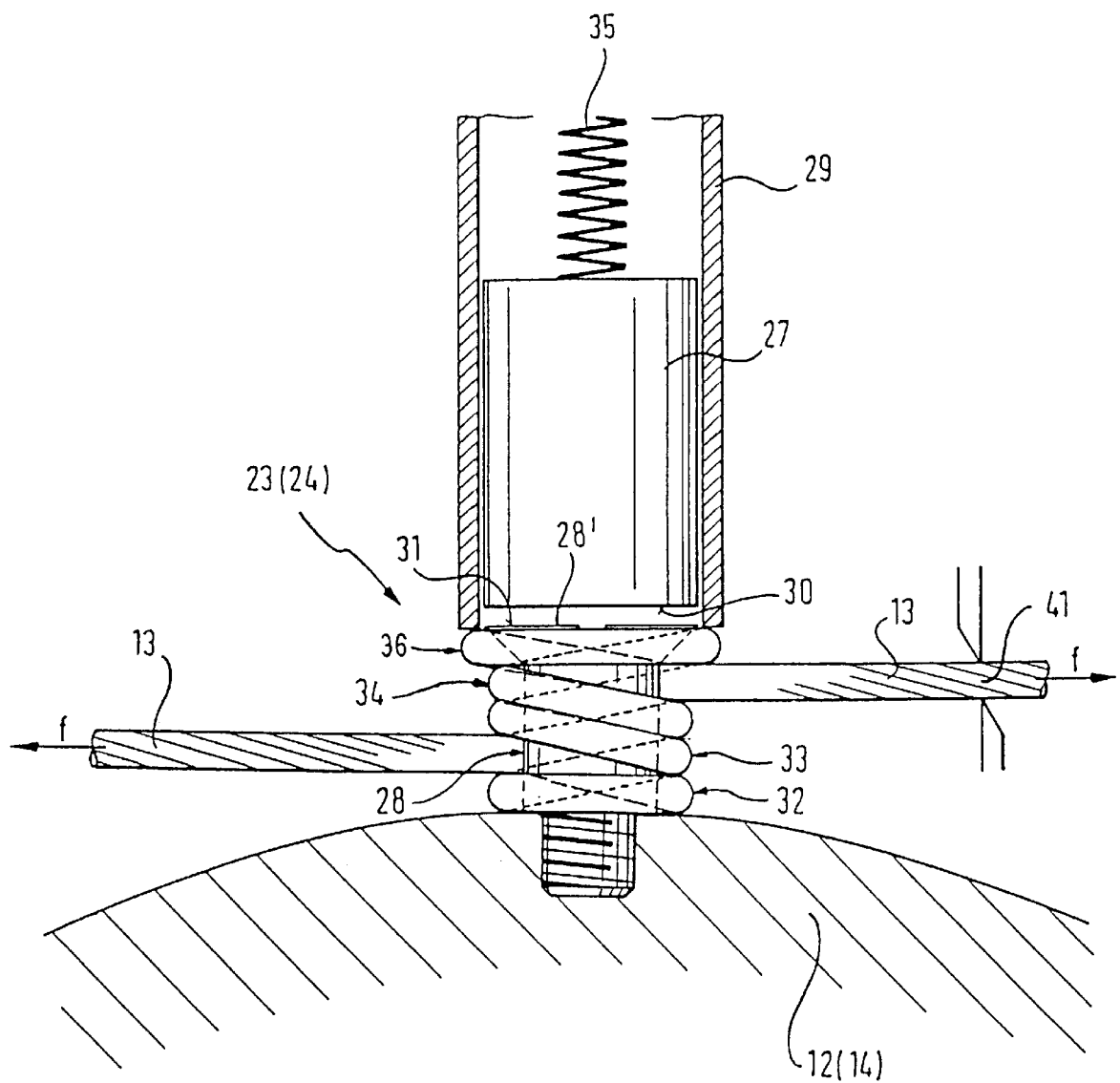
FIG. 12 shows the transfer of the fourth loop also onto the holding pin of the thread reel.

In another embodiment, a fourth loop is applied in accordance with FIG. 9 in a similar manner onto the installation pin 27, as has been explained with reference to FIGS. 5 and 7. In this embodiment, a fourth loop of thread 36 is wound around the installation pin 27 such that a portion of the thread adjoining the end of the third loop 34 facing the thread reel 12 is laid analogously to the first loop 32. As seen in FIG. 12, the installation 27 is then placed, near or confronting, the surface of the holding pin 31. The fourth loop 36 is then shifted from the installation pin 27 onto the holding pin 28 by the stripper 29. The fourth loop 36 now automatically pulls tight as a result of the tension present in thread 13.

The thread piece which runs out at the bottommost position on the holding pin 28 preferably merges into the periphery of the thread reel 12 or 14, whereas the other radially outwardly going thread piece is, for example, cut off at a cutting point 41. The arrangement could, however, also be reversed.

Other embodiments of the invention will be apparent to those skilled in the art from consideration of the specification and practice of the invention disclosed herein. It is intended that the specification be considered exemplary only, with the true scope and spirit of the invention being indicated by the following claims.

What is claimed is:

1. A method of securing the end of a thread standing under tension to a thread reel, comprising the steps of:
   (a) arranging a holding pin, having a free end, on the thread reel, the free end of the holding pin extending from a surface of the thread reel;
   (b) winding a first loop of the thread around an installation pin having a free end face;
   (c) arranging the installation pin with the free end face of the installation pin confronting the free end of the holding pin, wherein the installation pin is in axial alignment with the holding pin;
   (d) shifting the first loop from the installation pin onto the holding pin;
   (e) removing the installation pin from the holding pin;
   (f) winding a second loop of the thread around the installation pin such that a portion of the thread adjoining the end of the first loop facing the thread reel is laid around the installation pin analogously to the first loop;
   (g) arranging the installation pin with the free end of the installation pin confronting the free end of the holding pin, wherein the installation pin is in axial alignment with the holding pin; and
   (h) shifting the second loop from the installation pin onto the holding pin, wherein steps (e)–(h) occur after step (d).

2. A method in accordance with claim 1, further comprising the steps of:
   (i) winding a third loop of the thread around the installation pin such that a portion of the thread adjoining the end of the second loop facing the thread reel is laid around the installation pin analogously to the first loop;
   (j) arranging the installation pin with the free end of the installation pin confronting the free end of the holding pin, wherein the installation pin is in axial alignment with the holding pin; and
   (k) shifting the third loop from the installation pin onto the holding pin.

3. A method in accordance with claim 2, further comprising the steps of:
   (l) winding a fourth loop of the thread around the installation pin such that a portion of the thread adjoining the end of the third loop facing the thread reel is laid around the installation pin analogously to the first loop;
   (m) arranging the installation pin with the free end of the installation pin confronting the free end of the holding pin, wherein the installation pin is in axial alignment with the holding pin; and
   (n) shifting the fourth loop from the installation pin onto the holding pin.

4. A method in accordance with claim 1, wherein in steps (c) and (g), confronting is being in contact with.

5. A method in accordance with claim 1, wherein in steps (c) and (g), confronting is being spaced from.

6. A method in accordance with claim 1, wherein step (a) includes arranging the holding pin radially outward on the thread reel.

7. An apparatus for securing the end of a thread to a thread reel adapted for use in a spring-driven reeling device of a motor vehicle safety belt, comprising:
   a holding pin, with a first free end, connected to the thread reel;
   a movable installation pin, with a second free end, axially aligned with the holding pin, wherein the second free end is directly opposite to the first free end;
   a stripper displaceably mounted adjacent an outside surface of the installation pin; and
   a movement mechanism adapted to move the installation pin to form a loop of the thread guided around the installation pin,
   wherein the stripper is adapted to move from a first position to a second position to strip the loop from the installation pin and transfer the loop onto the directly opposite holding pin, to a location spaced from the first free end of said holding pin.

8. An apparatus in accordance with claim 7, wherein the thread reel is contained within a spring-driven reeling device, the spring-driven reeling device being mounted to a chassis of an automobile.

9. An apparatus for securing the end of a thread to a thread reel, comprising:
   a holding pin, with a first free end, connected to the thread reel;
   an installation pin, with a second free end, axially aligned with the holding pin, wherein the second free end is directly opposite to the first free end;
   a stripper displaceably mounted adjacent an outside surface of the installation pin; and
   a movement mechanism adapted to move the installation pin to form a loop of the thread guided around the installation pin.
   wherein the stripper is adapted to move from a first position to a second position to strip the loop from the installation pin and transfer the loop onto the holding pin,
   wherein the holding pin has a broadened head with an end face, wherein the installation pin has an end face and wherein the end face of the installation pin is at least substantially congruent with the end face of the holding pin head when the installation pin is arranged with the end face of the installation pin opposite to and confronting the end face of the holding pin head.

10. An apparatus in accordance with claim 9, wherein confronting is being spaced from.

11. An apparatus in accordance with claim 9, wherein confronting is being in contact with.

12. A thread reel apparatus with a thread wound thereon, comprising:
   a holding pin connected to an outer periphery of the thread reel, the holding pin having an end extended from a surface of the reel on which an end of the thread is secured by a plurality of loops laid around the holding pin in such a way that a loop end of the loop facing the thread reel simultaneously forms a start of a next loop spaced further from the thread reel, with a loop end of the next loop lying closer to the thread reel than said start of said next loop.

13. A thread reel apparatus with a thread wound thereon in accordance with claim 12, wherein the thread stands under tension, wherein a portion of the loop end of the loop facing the thread reel that forms the start of the next loop crosses over the loop end of the next loop, and wherein the loop end of the next loop is pulled tight by the tension forming a self-locking loop.

14. A thread reel apparatus with a thread wound thereon, comprising:

a holding pin connected to an outer periphery of the thread reel, the holding pin having an end extended from a surface of the reel on which an end of the thread is secured by a plurality of loops laid around the holding pin in such a way that a loop end of the loop facing the thread reel simultaneously forms a start of a next loop spaced further from the thread reel, with a loop end of the next loop lying closer to the thread reel than said start of said next loop;

an installation pin with a free end, having a first end face on the free end, wherein the holding pin has a broadened head with a second end face, such that the second end face is substantially congruent with the first end face when the installation pin is arranged with the first end face of the installation pin opposite to and confronting the second end face of the holding pin head.

15. A thread reel in accordance with claim 14, wherein confronting is being spaced from.

16. A thread reel in accordance with claim 14, wherein confronting is being in contact with.

* * * * *